United States Patent Office 3,157,742

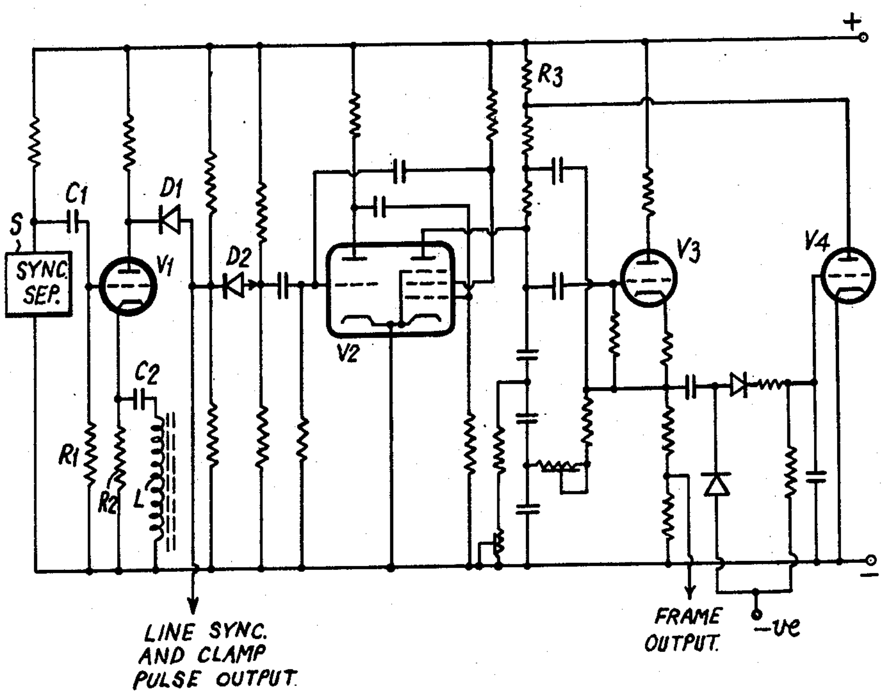
Inventor
M. J. D. Nurse
By Holcombe, Wetherill & Brisebois
Attorneys

Patented Nov. 17, 1964

3,157,742
FRAME AND LINE SYNCHRONIZING SIGNAL SEPARATOR USING SINUSOIDAL KEYING PULSES

Michael J. D. Nurse, Cambridge, England, assignor to Pye Limited, Cambridge, England, a company of Great Britain Filed May 21, 1962, Ser. No. 196,224
Claims priority, application Great Britain May 24, 1961
5 Claims. (Cl. 178—69.5)

The present invention relates to features of a frame scan circuit for use in television receivers or monitors.

According to the present invention, the line and frame synchronising pulses separated from the video signal are differentiated and fed to a circuit which produces output pulses of different amplitude for line synchronising pulses and frame synchronising pulses, these pulses being fed to at least one amplitude sensitive clipping circuit which only passes the pulses of greater amplitude whereby separation of the line synchronising pulses from the frame synchronising pulses is achieved. Preferably the circuit includes a valve which has a series tuned circuit resonant at a high frequency in its cathode circuit and arranged so that the differentiated waveform causes a sinusoidal pulse of current in the anode of the valve, each half cycle of sinusoidal form having a large amplitude and a sharp leading edge because of the high frequency of the tuned circuit. The sinusoidal pulses at the anode of the valve are applied to a first diode where they are clipped and employed for synchronising the line scan oscillator. These pulses are also applied to a second clipping diode which only passes the larger amplitude pulses for synchronisation of the frame scan oscillator.

According to a feature of the invention, the frame scan oscillator is a slow running oscillator, for example having a frequency of the order of 20 c./s., which is accurately triggered by the larger amplitude frame synchronising pulses passed by the second clipping diode to produce an output at frame repetition frequency. With such an arrangement it is possible to eliminate the frame hold control which normally has to be provided in the oscillator circuit.

The invention will now be further described with reference to the accompanying drawing which is a diagram of a frame scan circuit according to this invention.

Referring to the drawing, the output of negative going line and frame synchronising pulses from the synchronising separator stage S, which separates the synchronising pulses from the video signal is differentiated by the components R1, C1 and is then fed to a valve V1 which has a high value of bias resistor R2 in its cathode circuit which is by-passed by a series tuned circuit L, C2 resonant at a high frequency. The positive spikes of the differentiated waveform from R1, C1, which are coincident with the trailing edge of the synchronising pulses, cause a sinusoidal flow of current in the anode circuit of V1, each pulse being a half cycle of sinusoidal form having a large amplitude and a sharp leading edge because of the high resonant frequency of the tuned circuit. These negative pulses at the anode of V1 are first clipped at their positive edge by the diode D1 to give a clean base line to the pulses and the resulting waveform can be used for clamping and synchronising the line scan oscillator. The frame synchronising pulses however give rise to larger amplitude pulses which can be derived through the second clipping diode D2 so that clearly defined and accurately positioned frame synchronising pulses are obtained for synchronising the frame scan oscillator V2.

The frame scan oscillator comprises a triode pentode valve in which the triode and screen grid portion of the pentode function as a conventional multivibrator sawtooth generator and an output is taken from the anode of the pentode. The oscillator is designed to run at a low frequency of the order of 20 c./s., and is positively triggered by the frame synchronising pulses passed by D2 to produce an output sawtooth waveform at frame repetition frequency. With this arrangement it is not necessary to provide a frame hold control in the oscillator circuit. The output from the oscillator is fed to a boot-strap amplifier V3 to linearise the sawtooth waveform, the output from the boot-strap amplifier being fed to the frame output stage (not shown).

The circuit according to this invention may be employed in television receivers or monitors which are desired to operate at any of two or more different television scanning standards having different frame repetition frequencies, e.g. 50 cycles and 60 cycles, and wherein the receiver or monitor will reproduce television pictures from different scanning standards without requiring any manual adjustment of the scanning circuits. In such cases the boot-strap amplifier advantageously incorporates an amplitude control stage V4 in order to maintain the amplitude of the sawtooth output from the boot-strap amplifier V3 at a substantially constant amplitude at the different frame repetition frequencies. This amplitude control stage, of which the valve V4 has an anode load consisting of a resistor R3 forming part of the potential divider connected to the input of the boot-strap amplifier, forms the subject of my copending United States application No. 193,582, filed May 9, 1962.

With this arrangement any variation in scanning amplitude causes a variation in current through V4 and hence through the resistor R3 to stabilise the output sawtooth from the boot-strap amplifier V3.

To return now to the operation of V1, the reason for the generation of the larger amplitude pulses during the frame synchronising pulse periods is as follows. The line synchronising pulses derived from stage S are of considerably shorter duration than the frame synchronising pulses and the time constant of the differentiating circuit R1, C1 is such that when the line synchronising pulses are differentiated the positive going spike derived from the trailing edge of each synchronising pulse occurs before the capacitor is fully discharged so that it does not extend fully beyond the main base line but starts below this line. The frame synchronising period consists of a sequence of pulses each of half line period duration and therefore there is ample time for the differentiating circuit to discharge before the trailing edge of the first frame pulse occurs and the positive spike therefore sits upon the base line and extends to a greater amplitude than does the spike occurring from a line synchronising pulse.

In the British 405 line scanning standards the line synchronising pulse duration is $9\mu S$ and the pulses at the frame synchronising period are of $44\mu S$ duration and the time constant of the differentiating circuit R1, C1 must therefore lie between these two figures. The C.C.I.R. 625 line scanning standards and the R.E.T.N.A. 525 line scanning standards have pulses of very similar duration, namely approximately $4.7\mu S$ for the line synchronising pulses and $29.5\mu S$ for the frame synchronising pulses. Therefore if it is required for the frame scan circuit to work upon any of these standards, e.g. in a multi-standard monitor, the time constant of the differentiating circuit R1, C1 must lie between 9 and $29\mu S$. Succesful results have been achieved with the differentiating circuit having a time constant of $18\mu S$. Moreover in this circuit the first clipping diode D1 had a reference potential of approximately 220 volts and the second clipping diode D2 a reference potential of 125 volts, whilst the frame pulses derived therefrom were approximately 15 volts in amplitude.

Whilst particular embodiments have been described it will be understood that various modifications may be made without departing from the scope of this invention. Thus it will be apparent that the circuits can be used with other scanning standards besides those specifically mentioned.

I claim:

1. A circuit arrangement for producing output pulses of different amplitude for line synchronising pulses and for frame synchronising pulses fed to said circuit, said circuit arrangement comprising means for differentiating the line and frame synchronising pulses, a valve having an anode, a cathode and a control grid, a series tuned circuit connected to the cathode of said valve which is resonant at a frequency which is high with respect to the line synchronising pulse frequency, an amplitude sensitive clipping circuit connected to the anode of said valve, means for feeding the differentiated line and frame synchronising pulses to the control grid of said valve to make it conduct to cause sinusoidal pulses of current at the anode of the valve which are of the same phase for the line synchronising pulses and for the frame synchronising pulses, but of greater amplitude for the frame synchronising pulses, means for deriving said frame synchronising pulses of greater amplitude from one part of said amplitude sensitive clipping circuit which only passes said greater amplitude pulses and means for deriving said line synchronising pulses of lesser amplitude from a second part of said amplitude sensitive clipping circuit.

2. A circuit arrangement as claimed in claim 1 in which said amplitude sensitive clipping circuit comprises two diodes and said sinusoidal pulses at the anode of said valve are applied to the first diode which clips said pulses and from which the line synchronising pulses are derived, and means for applying the output pulses from said first diode to said second diode which only passes the greater amplitude frame synchronising pulses.

3. A circuit arrangement for producing output pulses of different amplitude for line synchronising pulses and for frame synchronising pulses fed to said circuit, said circuit arrangement comprising means for differentiating the line and frame synchronising pulses, a valve having an anode, a cathode and a control grid, a series tuned circuit connected to the cathode of said valve which is resonant at a frequency which is high with respect to the line synchronising pulse frequency, an amplitude sensitive clipping circuit connected to the anode of said valve, means for feeding the differentiated line and frame synchronising pulses to the control grid of said valve to make it conduct to cause sinusoidal pulses of current at the anode of the valve which are of the same phase for the line synchronising pulses and for the frame synchronising pulses, but of greater amplitude for the frame synchronising pulses, means for deriving said frame synchronising pulses of greater amplitude from one part of said amplitude sensitive clipping circuit which only passes said greater amplitude pulses, means for deriving said line synchronising pulses of lesser amplitude from a second part of said amplitude sensitive clipping circuit, and a slow running frame scan oscillator triggered by said greater amplitude frame synchronising pulses and producing an output at frame repetition frequency.

4. A circuit arrangement as claimed in claim 3, in which said frame scan oscillator has a frequency of the order of 20 cycles per second.

5. A circuit arrangement for producing output pulses of different amplitude for line synchronising pulses and for frame synchronising pulses fed to said circuit, said circuit arrangement comprising means for differentiating the line and frame synchronising pulses, a valve having an anode, a cathode and a control grid, a series tuned circuit connected to the cathode of said valve which is resonant at a frequency which is high with respect to the line synchronising pulse frequency, an amplitude sensitive clipping circuit comprising two interconnected diode devices connected to the anode of said valve, means for feeding the differentiated line and frame synchronising pulses to the control grid of said valve to make it conduct to cause sinusoidal pulses of current at the anode of the valve which are of the same phase for the line synchronising pulses and for the frame synchronising pulses, but of greater amplitude for the frame synchronising pulses, means for deriving said frame synchronising pulses of greater amplitude from the output of one of the diodes of said amplitude sensitive clipping circuit which only passes said greater amplitude pulses, means for deriving said line synchronising pulses of lesser amplitude from the output of the second of said diodes of said amplitude sensitive clipping circuit, and a slow running frame scan oscillator triggered by the greater amplitude frame synchronising pulses passed by said one of the diodes and producing an output at frame repetition frequency.

References Cited in the file of this patent

UNITED STATES PATENTS 2,761,010 Bridges ---------------- Aug. 28, 1956